United States Patent [19]
Brooks

[11] 3,824,867
[45] July 23, 1974

[54] MULTI-STAGE CONTROL FOR TORQUE CONVERTERS IN ENGINE DRIVEN VEHICLES

[75] Inventor: John Hawley Brooks, Encino, Calif.
[73] Assignee: McCulloch Corporation, Los Angeles, Calif.
[22] Filed: Dec. 7, 1972
[21] Appl. No.: 312,912

[52] U.S. Cl.................. 74/230.17 E, 192/105 B
[51] Int. Cl............................................ F16h 55/52
[58] Field of Search .......... 74/230.17 E; 192/105 B

[56] References Cited
UNITED STATES PATENTS

| | | | |
|---|---|---|---|
| 1,994,588 | 4/1935 | Nakashian | 192/105 B |
| 2,150,456 | 3/1939 | Perrine | 74/230.17 E |
| 2,172,991 | 12/1939 | Segard | 192/105 B |
| 2,180,217 | 11/1939 | Thomas | 74/230.17 E |
| 2,409,757 | 10/1946 | Hetzel | 192/105 B |
| 2,432,077 | 12/1947 | Segard | 192/105 B |
| 3,313,169 | 4/1967 | Peters | 74/230.17 E |
| 3,604,280 | 9/1971 | Davis | 74/230.17 E |
| 3,625,079 | 12/1971 | Hoff | 74/230.17 E |

FOREIGN PATENTS OR APPLICATIONS
1,073,260  3/1953  France .................... 74/230.17 E Primary Examiner—Charles J. Myhre
Assistant Examiner—R. H. Lazarus
Attorney, Agent, or Firm—Burns, Doane, Swecker & Mathis

[57] ABSTRACT

A method and apparatus wherein a variable sheave V-belt torque converter, particularly suitable for use with engine driven vehicles such as snowmobiles or the like, is controlled so that a wider spread is obtained between the engine speed at the time of belt engagement and the engine speed at the time of completion of the shift. Belt engagement occurs at an engine speed relatively close to idle speed, and shifting operations are delayed until about a speed corresponding to that of maximum engine torque. Completion of shifting occurs at about a speed corresponding to the speed of maximum engine power. This belt engagement and shifting control, which improved acceleration and climbing ability of an engine driven vehicle such as a snowmobile, is provided through multi-stage resilient control of the operation of centrifugal clutch shoes engageable with the movable pulley section of the torque converter. Such control may be accomplished through the use of a plurality of garter springs, or a plurality of compression springs.

22 Claims, 13 Drawing Figures

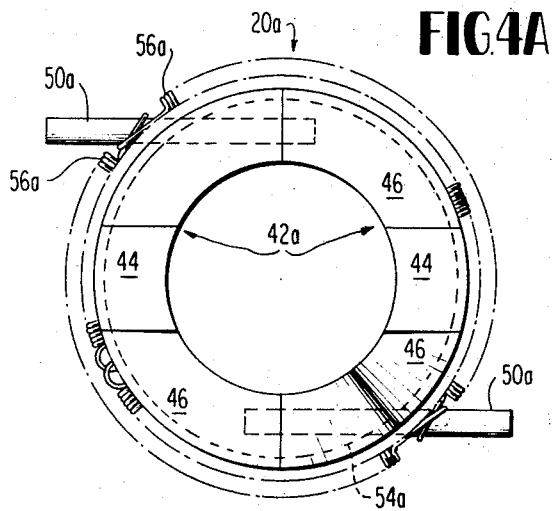
FIG.4A
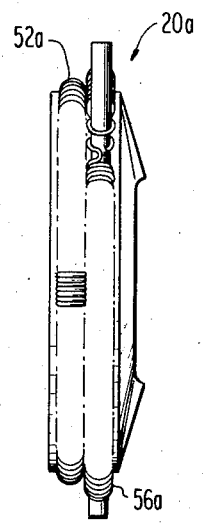
FIG.4B
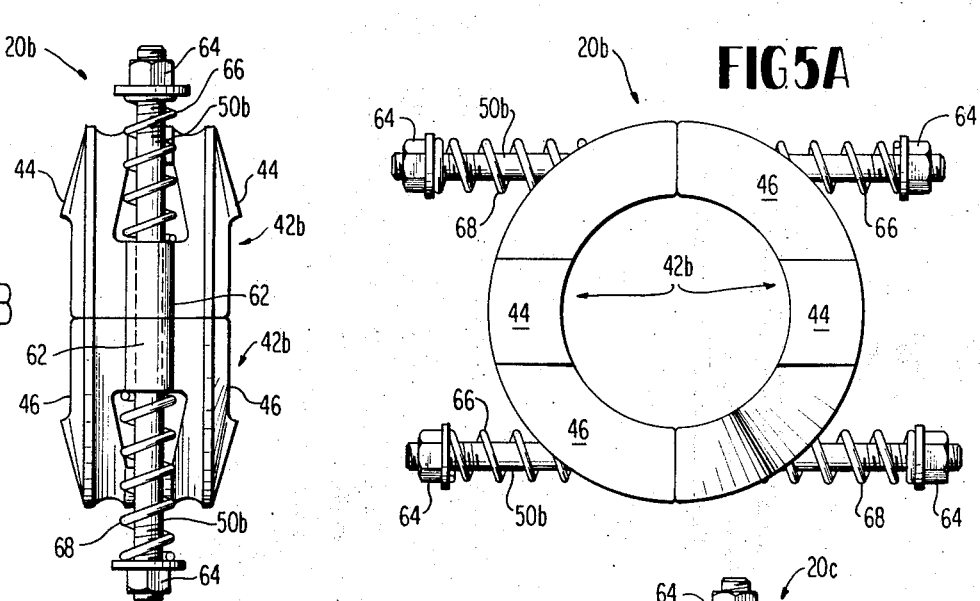
FIG.5A
FIG.5B
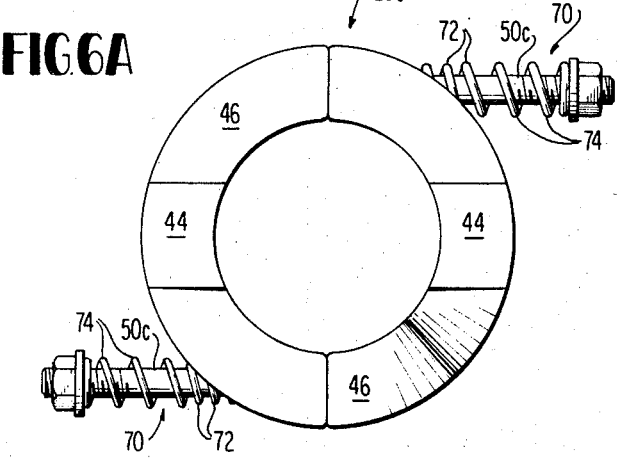
FIG.6A
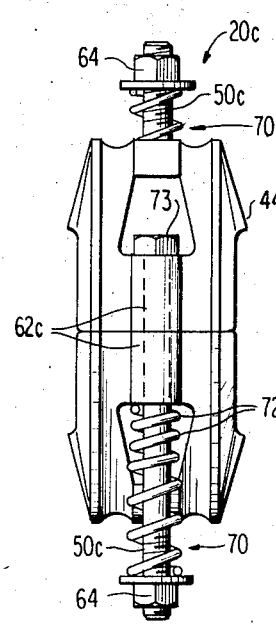
FIG.6B

MULTI-STAGE CONTROL FOR TORQUE CONVERTERS IN ENGINE DRIVEN VEHICLES

RELATED APPLICATION

This application is related to U.S. Pat. application Ser. No. 312,911 filed on even date herewith for "Shifting Control For Torque Converters In Engine Driven Racing Vehicles" by Harry L. McGeachy.

BACKGROUND OF THE INVENTION

This invention relates to variable sheave V-belt torque converters useful in connection with engine driven vehicles. More particularly, this invention relates to the multi-stage control of the operation of centrifugal clutch shoes of a variable sheave V-belt torque converter in a snowmobile transmission.

In the past, it has been common to utilize variable sheave V-belt torque converters in conjunction with engine driven vehicles such as snowmobiles. Such torque converters are often provided with govenor weights or clutch shoes in the driving pulley, with the weights functioning to control the engine speed by changing the effective pulley diameter. The radial outward displacement of the weights is increased by centrifugal force with the weights being biased toward an inner position by a spring or the like.

Examples of prior proposed variable sheave V-belt torque converters for use in conjunction with engine driven vehicles such as snowmobiles or the like may be found in Galleher U.S. Pat. No. 3,266,330 issued Aug. 16, 1966 and Beaudoin U.S. Pat. No. 3,659,470 issued May 2, 1972. The disclosures of these patents may be referred to for a general appreciation of basic structures and operations of torque converters of this type.

In typical torque converter arrangements which may be employed as power transmissions for snowmobiles, radially outward movement of the governor means or weights in response to increasing engine speed first acts to affect movement of one sheave section laterally closer toward a fixed sheave section, and into drivingly engaging contact with the sides of the belt disposed between the movable and fixed sections. Thereafter, increase of engine speed is operable to effect even further movement of the movable sheave section closer to the fixed sheave section so as to increase the belt radius, thereby changing the effective pulley diameter and the drive ratio.

It has been observed that by reason of the increasing radial movement of the governor means upon increasing speed, and further by reason of the geometric increase of centrifugal force upon increasing speed, typical speeds at which driving engagement with the belt occurs and at which drive ratio shifting is accomplished are fairly close together. For example, it has been observed that in arrangements of this type, the difference in engine speeds at the time of belt engagement and at the time of completion shifting is often in the range of about 600 to 1,000 rpm. In such arrangements, completion of the shift usually occurs at an engine speed well below that corresponding to even maximum engine torque, and belt engagement usually occurs at an engine speed well above the range of speeds corresponding to engine idle. As will be apparent the useful range of engine speeds is thus significantly limited. Examples of belt engagement and shifting data for observed engines utilizing variable sheave V-belt torque converters are tabulated as follows:

| Example | Engine Idle Range (rpm) | Speed Corresponding to Engine Maximum Torque (rpm) | Speed Corresponding to Engine Maximum Horsepower (rpm) | Engine Speed At Belt Engagement (rpm) | Engine speed at Shift Completion (rpm) |
|---|---|---|---|---|---|
| 1 | 1,500–1800 | 5500 | 7000 | 3200 | 3800 |
| 2 | 1500–1800 | 5500 | 7000 | 3800 | 4500 |
| 3 | 2000–2400 | 7500 | 9500 | 4500 | 5200 |
| 4 | 2000–2400 | 7500 | 9500 | 5500 | 6500 |
| 5 | 2200–2600 | 7500 | 9000 | 5500 | 6500 |

It will be appreciated that none of the combinations set forth in tabular form above entail either a low enough engine speed at belt engagement to take maximum advantage of the low idle speed, or a high enough engine speed at shifting to take maximum advantage of even maximum engine torque during the shift. Although modifications of such combinations may be envisioned through appropriate selection of a spring controlling the governor means so as to provide for belt engagement at lower engine speeds, such modification would not necessarily improve upon the overall useful range of speed. A better utilization of the full range of available speeds would be desirable.

OBJECTS AND SUMMARY OF PREFERRED FORMS OF THE INVENTION

It is, therefore, a general object of the present invention to provide a novel method and apparatus wherein a variable sheave V-belt torque converter, particularly suitable for use with engine driven vehicles such as snowmobiles, is capable of more efficient utilization of the available range of engine speeds.

It is another object of the present invention to provide such a novel method and apparatus wherein a wider spread is obtained between the engine speeds corresponding to belt engagement and corresponding to completion of the shift.

It is a particular object of the present invention to provide such a novel method and apparatus wherein the shifting operation is controlled so as to take place at an increased engine speed.

It is a further object of the present invention to provide such a novel method and apparatus wherein the difference between the range of engine idle speeds and the engine speed at which belt engagement takes place is decreased.

It is yet another object of the present invention to provide such a novel method and apparatus wherein belt engagement occurs in an engine speed closer to idle speed, shifting operations are delayed until an engine speed corresponding to about the engine speed at maximum engine torque is reached, and completion of shifting occurs at an engine speed corresponding to about the engine speed at maximum engine power.

It is a still further object of the present invention to provide such a novel method and apparatus for improving acceleration and climbing ability of an engine driven vehicle such as a snowmobile.

It is yet another object of the present invention to provide such a novel method and apparatus including a multi-stage spring control of the operation of centrifugal clutch shoes.

A preferred form of the invention intended to accomplish at least some of the foregoing objects comprises an engine for driving a snowmobile or the like, in combination with a variable sheave V-belt torque converter according to the present invention. The torque converter includes a pulley with a movable section displaceable against a v-belt by radially movable governor means. The governor means is a radially movable against the bias of multi-stage spring means operable to control the radial position of the governor means so that initial belt engagement occurs at an engine speed within a few hundred rpm of the speeds corresponding to engine idle, and completion of the belt shifting is delayed until at least about an engine speed corresponding to about the engine speed at substantially maximum engine torque. In this fashion, a full range of useful engine speed is provided through resilient, multi-stage control so that, for example, in the case of the snowmobile, slow cruising is facilitated if desired and acceleration and climbing performance is improved.

It is preferred that the belt engagement occur at an engine speed in the range of 250 to 550 rpm above the maximum idle speed of the engine. Also, although according to the present invention commencement of the shift may occur at about the engine speed corresponding to maximum engine torque, shifting is preferrably completed at about the engine speed corresponding to maximum engine power.

According to the present invention, the governor means may take the form of centrifugal weights slidably mounted on pin means for radial displacement in response to increases in engine speeds. In one embodiment of the invention, the multi-stage spring means may include first and second garter spring means extending circumferentially about the diametrically opposed centrifugal weights. The first garter spring means is operable so as to essentially control movement of the weights between a rest position and a first radial position effecting displacement of the movable sheave section to a position of belt engagement; whereas, the second garter spring means is operable so as to essentially control subsequent movement of the centrifugal weights to a second radial position effecting displacement of the movable sheave section to a position where a shifting operation is commenced. The first and second radial positions of the weights correspond respectively to an engine speed slightly above engine idle and an engine speed at about maximum engine torque.

With the pin means 180° displaced from one another, the second garter spring means may be constituted by two strong springs hooked to one another at the location of the pin means.

In the rest position of the centrifugal weights, the second garter spring means is, of course, in an essentially slack condition and does not exert any significant control over movement of the weights to the position causing belt engagement by the movable sheave section. Similarly, the strength of the first garter spring means is such that it does not exert any significant control over movement of the weights to the position causing belt shifting.

In a further form of the invention, the weights may be recessed at the location of the pin means. The ends of the pins comprising the pin means may be in the form of threaded bolts, and compression springs may be disposed between the recess bottoms and adjustable nuts on the ends of the threaded bolts. Two suitable compression spring means, for example two springs of the constant spring rate type, may be provided in connection with each weight. A shorter, spring of lighter strength, i.e. smaller spring rate may provide first spring means for essentially controlling the movement of the associated centrifugal weight between a rest position and the aforementioned first radial position corresponding to belt engagement. A longer heavier spring, i.e., one with a larger spring rate, constituting second spring means will be essentially inoperative from a control standpoint during such movement; but, at higher speeds, this second spring means provides resistence to and control of movement of the associated weight to the aforementioned second radial position, while the second spring means exerts essentially no control.

It is envisioned that a single compression spring, i.e., one associated with each weight, might be utilized as the multi-stage spring means according to the present invention. In this connection, each such spring would be positioned in a location similar to that of one of the two compression springs associated with each weight as discussed in relation to the preceeding embodiment of the invention. However, the springs would each be designed as a multi-stage spring such that one stage would be essentially inoperable from a control standpoint until engine speeds greater than that existing at the time of belt engagement. In this connection, a spring equivalent to two constant but different rate springs in series may be employed.

The present invention also contemplates assemblies wherein the governor means may itself be constituted by garter spring means. This garter spring means not only is operative to cause displacement of the movable sheave section but also, at the same time, is operative to provide spring control over movement of that sheave section to the position corresponding to belt engagement. A concentric, but slack garter spring, stronger than the spring constituting the governor means, may be placed inside of the garter spring constituting the governor means. This latter, stronger spring constitutes second garter spring means which does not come into play until after belt engagement, and thereafter is operative to essentially control displacement of the movable sheave section to a position causing belt shifting.

It will also be appreciated that in accordance with the present invention, multi-stage spring means may be provided in order to accomplish not only two stage control but also control in three or more stages. At each stage, significant control over weight and/or sheave section movement is essentially transferred to a different stage of the spring means; and the spring means stages operable at any given time are essentially inoperable, from a control standpoint, during other times.

Other objects and advantages of the present invention will become apparent from the subsequent detailed description of preferred forms thereof in conjunction with the accompanying drawings in which like numerals refer to like elements and in which:

THE DRAWINGS

FIGS. 4A and 4B are front and side views respectively similar to FIGS. 3A and 3B, but illustrating an alternative embodiment of a governor means and spring arrangement according to the present invention;

FIGS. 5A and 5B are front and side views respectively similar to FIGS. 3A and 3B, but showing another embodiment of a governor means and spring arrangement according to the present invention; and FIGS. 6A and 6B are front and side views respectively similar to FIGS. 3A and 3B, but showing a further embodiment of a governor means and spring arrangement according to the present invention.

DETAILED DESCRIPTION

Figure 1:
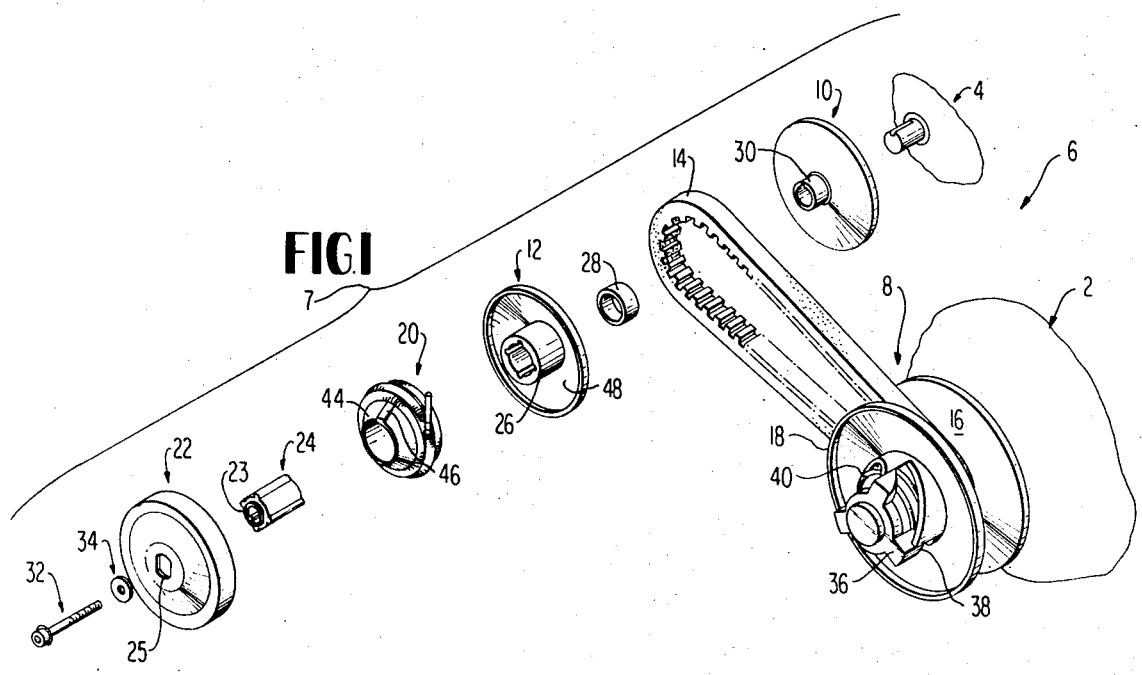
FIG. 1 is a schematic illustration including an assembly view in perspective of a preferred form of a variable sheave V-belt torque converter employed in the transmission of an engine driven vehicle according to the present invention.

With reference now to FIG. 1, it may be seen that in accordance with the present invention, a vehicle may include a drive assembly 2 driven by an engine, a portion of which is schematically shown at 4, through a transmission 6 illustrated in part in assembly view. The illustrated transmission 6 comprises a variable sheave V-belt torque converter, and includes a driving pulley assembly 7 and a driven pulley assembly 8.

In a well-known manner, the driving pulley assembly 7 is comprised of a fixed or stationary sheave section 10 and a movable sheave section 12. Receivable therebetween, also in a well-known manner, is a V-belt 14 which extends from the driving pulley assembly 7 to the driven pulley assembly 8. As will be appreciated, this driven pulley assembly 8 includes a fixed sheave section 16, and a movable sheave section 18 between which the belt is received.

Included in the driving pulley assembly 7 to which power is transmitted from the engine 4 is a shoe driver sub-assembly 20 hereinafter more fully described in connection with FIGS. 3A and 3B. During operation of the driving pulley assembly 7, this shoe driver sub-assembly 20 is captured between the movable sheave section 12 and a driver drum 22.

In assembly, a projection 23 of a hub driver 24 is in driven interengagement with a central aperature section 25 of the driver drum 22. The hub driver 24 extends axially of the driver drum 22, through the shoe driver sub-assembly 20, and into sheave driving engagement received within an axially extending generally cylindrical portion 26 of the movable sheave section 12. This extending portion 26 of the movable sheave section 12 also projects through the shoe driver sub-assembly. An idler bushing 28 is disposed between the stationary sheave 10 and the movable sheave 12. The bushing encircles an axially extending, generally cylindrical portion 30 of the former and is receivable within an aperture of the latter during its displacement. This idler bushing 28, together with a screw 32 and a washer 34 completes the assembly of driving pulley assembly 7.

The driven pulley assembly 8, through which power transmission is made to the vehicle 2, includes in addition to the fixed sheave section 16 and the movable sheave section 18, a cam block 36 with nylon slide inserts 38, and a helical spring 40.

With particular reference to FIGS. 2A, 2B, 2C, 2D, 3A and 3B, the structure and operation of the shoe driver sub-assembly 20 may be more fully understood. This sub-assembly 20 includes a governor means in the form of centrifugally responsive weights or clutch shoes 42, symetrically and diametrically opposed. The shoes 42 are generally semi-circular in shape. Each shoe is provided with laterally disposed, tapered cam surfaces 44 and 46 (see also FIG. 1). These cam surfaces 44 and 46 are cooperable with a generally frusto-conical inner surface 48 of the movable pulley section 12 and that 49 of the driver drum 22.

Figure 2A:
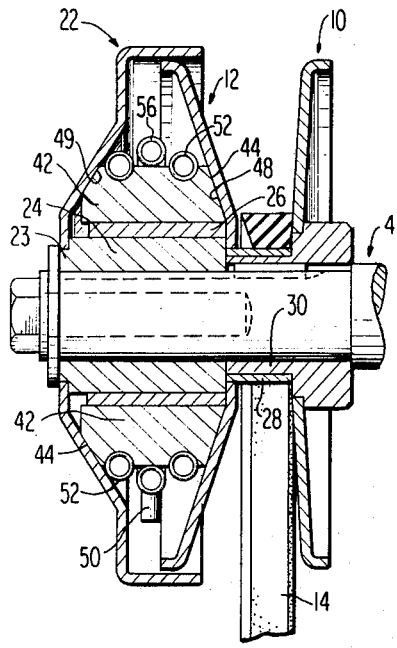
FIGS. 2A, 2B, 2C and 2D are cross-sectional views depicting a portion of the transmission of FIG. 1 with the torque converter shown respectively in the idle position, the belt engaging position, the belt shifting position, and the completed shift position.

FIG. 2A depicts the idle position of the transmission 6 with the engine 4 at idle speeds. In this position, the shoes 42 comprising the centrifugally responsive governor means are at a rest position, i.e. at their radially innermost position. As the engine speed is brought up to speeds greater than those corresponding to the range of engine idle speeds, the centrifugal shoes 42, by reason of frictional engagement between their cam surfaces 44 and 46 with the hub driver surface 49, are also brought up to an increased speed. The shoes 42 are centrifugally responsive so as to thus move radially outwardly from the axis of the driving pulley assembly 7. Such radial outward movement causes lateral displacement of the movable sheave section 12 toward the fixed sheave section 10 by cooperation between the shoe cam surfaces 44 and 46 and the inner sheave surface 48.

As will be appreciated radial movement of the shoes 42 is guided by pin means. In the embodiment depicted in FIGS. 3A and 3B, the pin means is comprised of first and second pins 50 received within aligned apertures (not shown) in the shoes 42. These pins 50 are located about 180° displaced from one another. Each pin is slidably received by one of the shoes 42 so as to accomodate its radial displacement and is suitably fixed to the other shoe 42 in order to maintain alignment.

Figure 2B:
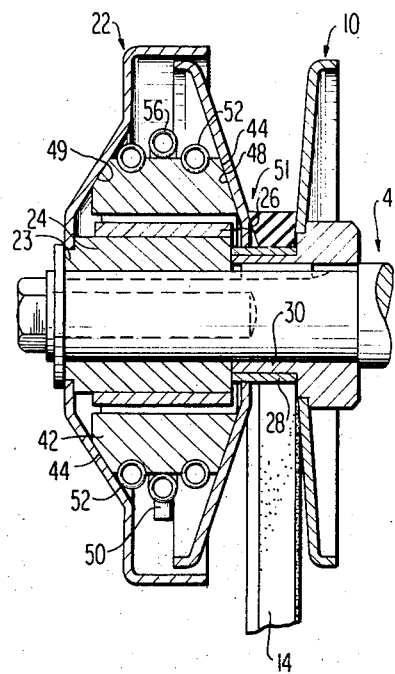

When the engine reaches a sufficient speed, preferably with the range of about 250 to 550 rpm above engine idle, belt engagement as depicted at 51 in FIG. 2B takes place. As will be apparent, at belt engagement, the weights 42 are in a first radially outward position.

During movement of the movable sheave section 12 from the FIG. 2A rest position to the FIG. 2B belt engaging position, the first stage of a multi-stage spring means is operative to resist radially outward movement of the weights 42. This multi-stage spring means normally biases the weights 42 to the FIG. 2A rest position. However, the strength of the multi-stage spring means at the first stage is only of sufficient magnitude to resist radially outward movement of the weights to the FIG. 2A position at engine speeds close to engine idle and preferably within the preferred range thereabove. Between engine idle and such predetermined speeds corresponding to belt engagement, the first stage of the multi-stage spring means continuously exerts a resistance against weight movement. As the engine speed increases beyond that predetermined speed the weights 42 gradually move outward toward a second radially outward position depicted at 51b in FIG. 2D.

Figure 2C:
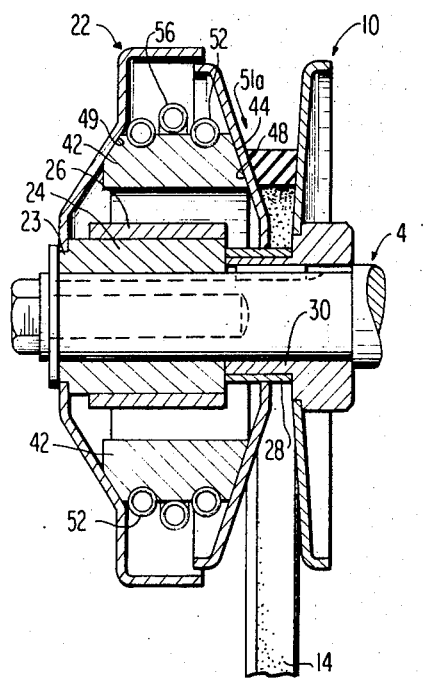
Figure 2D:
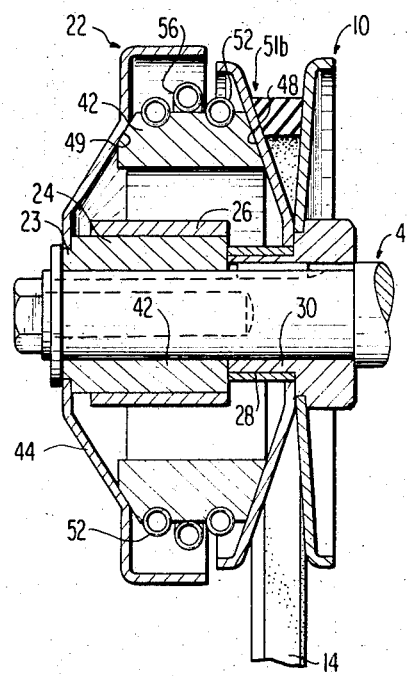

The FIG. 2D position is illustrative of completion of the shift which preferably takes place at an engine speed corresponding to about the speed at engine maximum horsepower. Commencement of the shift, illustrated at 51a in FIG. 2C, preferably occurs at an engine speed corresponding to about the speed of maximum engine torque.

During movement of the weights 42 from the first radially outward position of FIG. 2B to the second radially outward position of FIG. 2D, the second stage of the multi-stage spring means is continuously operative to resist such movement. This second stage is normally inoperable from a control standpoint during initial movement of the weights 42 to the FIG. 2B position. Similarly, the first stage of the multi-stage spring means is essentially inoperable from a control standpoint during weight movement between the FIG. 2B and 2D positions.

Figure 3A:
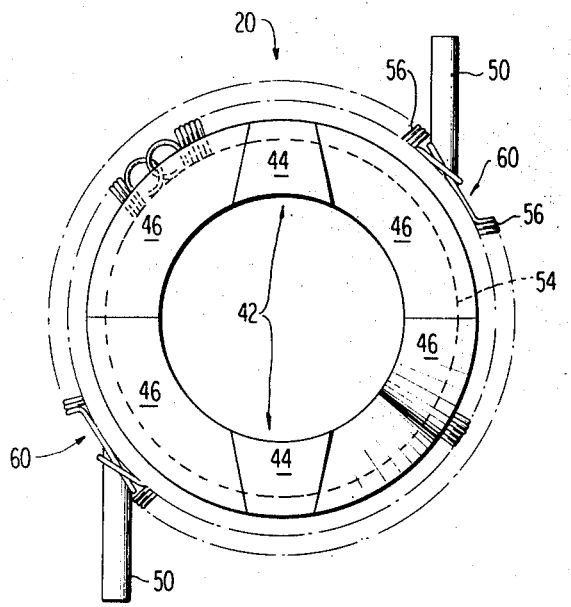
FIG. 3A is a front view of a portion of the torque converter of FIG. 1 and depicting the spring means and governor means thereof.
Figure 3B:
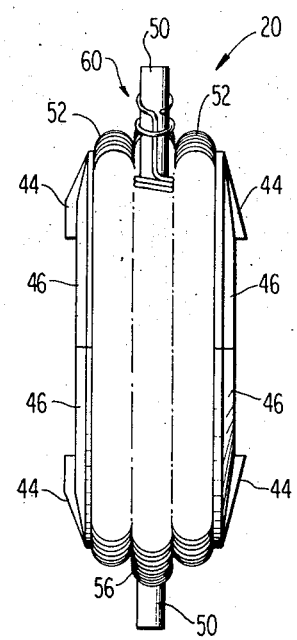
FIG. 3B is a side view of the portion of the torque converter of FIG. 3A.

With renewed reference to FIGS. 3A and 3B, it may be seen that the multi-stage spring means according to the present invention may be comprised of first and second stage garter spring means. The first stage garter spring means includes two garter springs 52. These springs 52 extend circumferentially about the shoe-driver assembly 20 and are received in circumferentially extending grooves 54 in the radially outer periphery of the shoes 42.

The springs 52 are of a design strength sufficient to provide control during first stage movement as earlier noted. Apart from this design strength and the provision of the second stage garter spring means, to be described, the entire assembly of the transmission thus far described is commercially available and schematically depicted in a bulletin entitled "Comet C.A.T.-99N Torque Converter Assembly Sequence and Parts List." In prior torque convertors, however, springs corresponding to the springs 52 functioned to provide control of weight movement in conjunction with both belt engagement and shifting, thereby significantly limiting the useful range of engine speeds and failing to take advantage of shifting at maximum engine torque.

The second garter spring means, of a design strength sufficient to provide control only during second stage movement as earlier noted, may be comprised of two garter springs 56, 56. These springs extend circumferentially about the weights 42 and are located generally in the plane in which the pins 50 are located. The springs 56, 56 are provided with hooks 60 at opposite ends, which hooks 60 are sufficiently large to straddle the pins 50. In this fashion, the pins 50 function to locate the second stage garter spring means in the same plane as the pins and serve to retain that garter spring means in assembly.

If desired, the outer circumferential periphery of the weights 42 may be provided with additional grooves, similar to those indicated at 54, in order to further facilitate orientation of the garter springs 56, 56 when they are extended beyond their slack positions of FIGS. 2A and 2B to their stretched positions of FIGS. 2C and 2D.

Referring now to FIGS. 4A and 4B, an alternative form of a shoe driver sub-assembly 20a including multi-stage spring means in accordance with the present invention may be understood. This form of the shoe driver sub-assembly 20a is similar to that of FIGS. 3A and 3B and like numerals refer to like functioning elements.

In this connection, it will be appreciated that the centrifugally responsive weights 42a are guided by pins 50a each slidably receiving one weight and being anchored to the other. However, the first garter spring means is comprised of a single garter spring 52a received in a circumferential groove 54a. The second garter spring means is again comprised of two garter springs 56a, 56a.

When used in place of the shoe driver sub-assembly 20 in an assembly such as illustrated in FIG. 1, the shoe driver sub-assembly 20a functions similarly to control movement of the shoes 42a and a cooperating movable sheave section to positions corresponding to those of FIGS. 2A, 2B, 2C and 2D. Thus, the second garter spring means 56a, 56a is in an inoperative, i.e., rest position, until such time as the speed of the engine 4 causes radially outward movement of the weights 42a, under the control of the first garter spring means 52a, sufficient for belt engagement. Thereafter, increases in engine speed which tend to cause further radially outward movement of the weights 42a are resisted by the second garter spring means 56a, 56a. It will be appreciated that the strength of the first garter means 52a is such as to render that spring means essentially inoperable from a control standpoint in connection with such further outward movement of the weights 42a.

Preferably, as before, in accordance with the present invention, the first garter spring means 52a is of a sufficient strength to resist displacement of the weight 42a, and thus the cooperating movable pulley section, to the belt shifting position at least until the engine reaches a predetermined speed in the range of 250-550 rpm above engine idle. Design of the second garter spring means 56a, 56a so as to resist further displacement of the weights 42a radially outwardly beyond the position corresponding to belt engagement is preferably such that even commencement of the shifting is delayed until an engine speed corresponding to that at maximum engine torque is reached, and completion of the shift is subsequently accomplished at an engine speed corresponding to that at maximum engine horsepower.

FIGS. 5A and 5B illustrate another shoe-driver sub-assembly 20b that may be utilized in place of that of FIGS. 3A and 3B in the assembly of FIG. 1. Again, like numerals refer to like functioning elements.

The shoes 42b are guided and oriented by two pins 50b, each of which projects through both shoes 42b. Adjacent the location of aligned sets of pin receiving holes in the shoes 42b, the outer circumferential periphery of each shoe is provided with a spring receiving pocket 62. The bottom of each of the four pockets 62 provides a bearing surface for a compression spring, the other end of which bears against an adjustable nut 64 received on the outer threaded ends of the pins 50b on which the springs are mounted.

In all, the sub-assembly of FIGS. 5A and 5B includes four compression springs 66,66, and 68,68 forming together the multi-stage spring means for controlling radial shoe displacement in a manner similar to that earlier described. A shorter and lighter, i.e., smaller spring rate, pair of two of these diagonally opposite compression springs 66,66 associated with the pockets 62 of opposite shoes function as the first stage of the multi-stage spring means; and the remaining longer and stronger, i.e., greater spring rate two diagonally opposite springs 68,68 associated with the other pockets 62 of the opposite shoes, function as the second stage springs.

The illustrated coil compression springs 66,66, 68,68 may be of the constant rate type, with the first stage springs 66,66 being lighter than the second stage springs 68,68 which do not come into play until after belt engagement. Since operation of the diagonally paired springs 66,66 and 68,68, from the standpoint of control of shoe displacement, respectively corresponds to that of the garter springs 52 and 56 of the embodiment of FIGS. 2A and 2B, such operation need not be described in detail. In this connection, it need only be appreciated that radial movement of the weights is generally symmetrical about the axis of the shoe driver sub-assembly 20b even though the spring pairs are disposed in pockets of different shoes, since the pins 50b are slidable in both shoes and are diagonially paired.

Thus, in operation, initial shoe displacement ultimately results in the first stage compression springs going "solid." During shoe movement that results in this "solid" condition, the outer ends of the pins at the location of the nuts 64 cooperating with the second stage springs are shifted slightly outward since the second stage springs undergo very little, if any compression. Of course, at the same time the opposite pin ends move radially inward contributing to the cause of the solid condition. Second stage movement is then controlled by only the second stage springs 68.

FIGS. 6A and 6B depict a further shoe driver sub-assembly 20c similar to that of FIGS. 5A and 5B and similarly usable in the place of the shoe-driver sub-assembly of FIG. 1. However, in the embodiment of FIGS. 6A and 6B only two springs 70,70, diametrically oppositely situated, are employed. In this embodiment, one end of each of the pins 50c is fully received within the pocket 62c associated with the shoe that does not receive a spring on a given side of the assembly. These pin ends are provided with enlarged ends 73 to prevent pin withdrawal.

The compression springs 70,70 may be constructed as springs having an initial spring rate operable during a portion of compression, which initial rate differs from a second spring rate operable during a second portion of compression. Thus, the springs may operate in essentially two control stages corresponding respectively to the multi-stage operation provided by the garter springs 52 and 56 of the FIG. 2A and 2B embodiment. In this connection, the springs 70, 70 may each function as two constant rate springs in series, with initial springs coils 72 being essentially a spring with one rate and the outer spring coils being a spring with a higher rate. Weight movement to belt-engaging position would be controlled by the series springs functioning in a known manner as an equivalent constant rate spring. However, such movement would be essentially under the control of the initial spring coils 72 adacent the bottoms of the pockets 62c insofar as the spring would be designed so that the initial coils 72 go "solid" at about the time of belt engagement. Shifting movement would then essentially be controlled by the outer spring coils 74.

As will be appreciated, the embodiments of FIGS. 5A and 5B and 6A and 6B might be modified to utilize modified variable rate compression springs, so long as essentially discrete staging were realized.

From the foregoing it will be seen that according to the present invention, a novel method and apparatus may be provided wherein a variable sheave V-belt torque converter usable as a snowmobile transmission or the like is capable of efficient utilization of the available range of engine speeds through the provision of multi-stage resilient control of governor means.

Of particular significance is the wider spread obtained between engine speeds corresponding to belt engagement and shifting. In this connection, utilization of at least maximum engine torque at the time of shifting, and utilization of operating speeds close to engine idle is particularly helpful. In this fashion cruising capability may be increased and acceleration and climbing ability may be improved.

It will also be appreciated that both the embodiments of FIGS. 5A, 5B and 6A, 6B are additionally advantageous in that the centrifugal forces acting on the springs should have a minimal effect, and, problems associate with garter spring orientation are eliminated, as set forth in the aforesaid application Ser. No. 312,911. In addition, the threaded rod ends permit advantageous adjustment of the preload of the springs so as to permit further selective control over the speeds at which belt engagement and shifting occurs also as set forth in the aforesaid application serial no.

Although the present invention has been described in connection with preferred forms thereof, it will be appreciated that additions, deletions, substitutions and modifications may be made without departing from the spirit and scope of the invention defined in the appended claims.

What is claimed is:

1. Apparatus comprising:
a variable sheave V-belt torque converter including:

drivable pulley means comprising:
      a fixed pulley section, and
      a movable pulley section;
    variable drive ratio belt means disposed between said fixed pulley section and said movable pulley section, and,
    centrifugally responsive governor means for producing controlled movement of said fixed pulley section relative to said movable pulley section,
    engine means driving said pulley means and operably connected to said governor means to displace said governor means;
    said centrifugally responsive governor means including means radially outwardly displaceable
      in a first displacement stage to shift said movable pulley section at least into driving engagement with said belt for establishing a first drive ratio, and
      in a subsequent displacement stage to shift said belt means into a shifted position for establishing a different drive ratio;
    multi-stage spring means for resiliently controlling said governor means, said multi-stage spring means having first and second spring means establishing
      a first control stage for resisting governor movement in said first displacement stage with a first spring rate, and a subsequent control stage for resisting governor movement in said subsequent displacement stage with a second spring rate greater than said first spring rate;
one of said first and second spring means being arranged to be inactive during one of said control stages in which the other of said first and second spring means is active such that the spring rate for said one control stage is established independently of said one spring means.

2. Apparatus according to claim 1 wherein:
said multi-stage spring means is operable to resiliently control movement of said centrifugally responsive governor means so that movement thereof to said belt engaging position is delayed until said engine reaches speeds within the range of 250 to 550 rpm above maximum engine idle speed.

3. Apparatus according to claim 1 wherein said one of said spring means is arranged to be inactive in said first control stage and active in said subsequent control stage; the other of said spring means being arranged to be inactive in said subsequent control stage and active in said first control stage such that the engine speed occurring at belt engagement and the engine speed occurring at said belt shifted position are established independently of one another.

4. Apparatus according to claim 3 wherein said multi-stage spring means includes at least four compression springs mounted on outwardly extending pin means with pairs of said springs in diagonally opposed locations; diagonally opposed ones of said springs having the same spring rate; one diagonally opposed pair of the compression springs establishing said first spring rate independently of another diagonally opposed pair of the compression springs; and said other pair of springs establishing said second spring rate independently of said one pair of springs.

5. Apparatus according to claim 1 wherein said first spring means is arranged to be active in the first control stage and inactive in the subsequent control stage; said second spring means being arranged to be active in both control stages such that engine speed occurring at belt engagement is established independently of engine speed occurring at said belt shifted position.

6. Apparatus according to claim 5 wherein said multi-stage spring means comprises at least one pair of coil compression springs mounted on outwardly extending pin means so as to apply resisting forces in opposed directions; each of said coil springs having first and second coil portions; said first coil portions having the same spring rate; said second coil portions having the same spring rate; said first and second coil portions establishing said first spring rate; and said second coil portions establishing said second spring rate independently of said first coil portions.

7. Apparatus according to claim 1 wherein said spring means is arranged to delay movement of said belt to said shifted position until maximum engine torque is attained.

8. Apparatus according to claim 1 wherein said first spring means is arranged to be active in the first and second control stages and said second spring means is arranged to be inactive in said first control stage and active in said subsequent control stage such that engine speed at said belt shifted position is established independently of engine speed at belt engagement.

9. Apparatus according to claim 8 wherein said first spring means comprises first garter spring means expandable radially outwardly to resist governor movement in said first displacement stage; and said subsequent control stage includes second garter spring means disposed in a slackened condition during the first displacement stage and arranged to resist governor movement in said second displacement stage; said first and second garter spring means establishing said second spring rate, and said first garter spring means establishing said first spring rate independently of said second garter spring means.

10. Apparatus according to claim 1 wherein said means radially outwardly displaceable comprises a plurality of weights which are acted upon by said multi-stage spring means.

11. Apparatus according to claim 10 wherein said multi-stage spring means includes at least four compression springs mounted on outwardly extending pin means with pairs of said springs in diagonally opposed locations; diagonally opposed ones of said springs having the same spring rate; one diagonally opposed pair of the compression springs establishing said first spring rate independently of another diagonally opposed pair of the compression springs; said other pair of springs establishing said second spring rate independently of said one pair of springs, such that the engine speed occurring at belt engagement and the engine speed occurring at said belt shifted position are established independently of one another.

12. Apparatus according to claim 10 wherein said multi-stage spring means comprises at least one pair of coil compression springs mounted on outwardly extending pin means so as to apply resisting forces in opposed directions; each of said coil springs having first and second coil portions; said first coil portions having the same spring rate; said second coil portions having the same spring rate; said first and second coil portions establishing said first spring rate; and said second coil portions establishing said second spring rate independently of said first coil portions such that the engine speed occurring at belt engagement is established independently of engine speed occurring at said belt shifted position.

13. Apparatus according to claim 10 wherein said first control stage comprises first garter spring means expandable radially outwardly to resist governor movement in said first displacement stage; and said subsequent control stage includes second garter spring means disposed in a slackened condition during the first displacement stage and arranged to resist governor movement in said second displacement stage; said first and second garter spring means establishing said said spring rate, and said first spring means establishing said first spring rate independently of said second garter spring means, such that said subsequent spring stage acts independently of said first spring stage wherein the engine speed at said belt shifted position is established independently of engine speed at belt engagement.

14. Apparatus according to claim 13 wherein:
said torque converter includes pin means projecting from and guiding said weights, and wherein
said second garter spring means is attached to said pin means.

15. Apparatus comprising:
a variable sheave V-belt torque converter including:

drivable pulley means comprising:
a fixed pulley section, and
a movable pulley section;
variable drive ratio belt means disposed between said fixed pulley section and said movable pulley section, and
centrifugally responsive governor means for producing controlled movement of said fixed pulley section relative to said movable pulley section,
engine means driving said pulley means and operably connected to said governor means to displace said governor means;
said centrifugally responsive governor means including means radially outwardly displaceable
in a first displacement stage to shift said movable pulley section at least into driving engagement with said belt means for establishing a first drive ratio, and
in a subsequent displacement stage to shift said belt means into a shifted position for establishing a different drive ratio;
multi-stage spring means having
a first control stage resisting the engagement of said movable pulley section and said belt means with a first spring rate, and
a subsequent control stage resisting the shifting of said belt into said shifted position with a second spring rate greater than said first spring rate such that shifting of said belt into said shifted position is prevented until said engine attains a speed corresponding substantially to maximum engine torque.

16. Apparatus according to claim 15 wherein said means radially outwardly displaceable comprises a plurality of weights which are acted upon by said multi-stage spring means.

17. A method of driving an engine driven vehicle under the control of a variable sheave V-belt torque converter including variable driveratio belt means, a stationary pulley section, a movable pulley section shiftable relative to said stationary pulley section to establish a plurality of drive ratios of said belt in a plurality of relative positions of said pulley sections, and centrifugally responsive means for shifting said movable pulley sections, the improvement comprising:
driving said engine at a speed sufficient to develop centrifugal forces great enough to displace said centrifugal means in a first displacement stage and shift said movable pulley section at least into driving engagement with said belt means for establishing a first drive ratio;
subsequently driving said engine at a speed sufficient to develop centrifugal forces great enough to displace said centrifugal means in a subsequent displacement stage and move said movable pulley section into a shifted position to establish different drive ratio of said belt means;
resisting said displacement stages with multi-stage spring means, having at least first and second spring means, by establishing
a first control stage having a first spring rate for resisting movement of said centrifugal means in said first displacement stage, and
a subsequent control stage having a second spring rate, greater than said first spring rate, for resisting movement of said centrifugal means in said subsequent displacement stage; and establishing one of said spring rates with one of said spring means being inactive, such that said one spring rate is established independently of said one spring means.

18. A method according to claim 17 wherein said one of said spring means is inactive in the first control stage and active in the subsequent control stage; the other spring means being inactive in the subsequent control stage and active in the first control stage such that the engine speed occurring at belt engagement and the engine speed occurring at said belt shifted position are established independently of one another.

19. A method according to claim 17 wherein said first spring means is active in the first control stage and inactive in the subsequent control stage; said second spring means being active in both control stages such that engine speed occurring at belt engagement is established independently of engine speed occurring at said belt shifted position.

20. A method according to claim 17 wherein said first spring means is active in the first and second control stages; and said second spring means is inactive in the first control stage and active in said subsequent control stage such that engine speed at said belt shifted position is established independently of engine speed at belt engagement.

21. A method according to claim 17 wherein movement of said belt into said shifted position is delayed until maximum engine torque is attained.

22. A method of driving an engine driven vehicle under the control of a variable sheave V-belt torque converter including variable drive-ratio belt means, a stationary pulley section, a movable pulley section shiftable relative to said stationary pulley section to establish a plurality of drive ratios of said belt in a plurality of relative positions of said pulley sections, and centrifugally responsive means for shifting said movable pulley sections, the improvement comprising:
driving said engine at a speed sufficient to develop centrifugal forces great enough to move said movable pulley section at least into driving engagement with said belt means for establishing a first drive ratio;
resisting said movable pulley movement with the first control stage of a multi-stage spring means having a first spring rate,
driving said engine at a speed sufficient to develop centrifugal forces great enough to shift said movable pulley section into a shifted position to establish a different drive ratio of said belt means, and resisting said movable pulley shifting with a subsequent control stage of the multi-stage spring means having a second spring rate greater than the first spring rate so that shifting of said belt into said shifted position is prevented until said engine attains a speed corresponding substantially to maximum engine torque.

* * * * *